(12) United States Patent
Olszewski et al.

(10) Patent No.: US 9,317,911 B2
(45) Date of Patent: Apr. 19, 2016

(54) AUTOMATIC ASSESSMENT OF CONFIDENCE IN IMAGING DATA

(75) Inventors: Mark Olszewski, Solon, OH (US); Joerg Bredno, San Francisco, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 365 days.

(21) Appl. No.: 13/266,469

(22) PCT Filed: Apr. 9, 2010

(86) PCT No.: PCT/IB2010/051539
§ 371 (c)(1),
(2), (4) Date: Oct. 27, 2011

(87) PCT Pub. No.: WO2010/128412
PCT Pub. Date: Nov. 11, 2010

(65) Prior Publication Data
US 2012/0051614 A1    Mar. 1, 2012

Related U.S. Application Data

(60) Provisional application No. 61/175,561, filed on May 5, 2009.

(51) Int. Cl.
*G06K 9/00* (2006.01)
*G06T 7/00* (2006.01)

(52) U.S. Cl.
CPC ..... *G06T 7/0002* (2013.01); *G06T 2207/10072* (2013.01); *G06T 2207/30016* (2013.01); *G06T 2207/30104* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 5,600,574 A | 2/1997 | Reitan | |
| 8,018,487 B2 | 9/2011 | Reiner | |
| 2004/0179651 A1 | 9/2004 | Tong et al. | |
| 2005/0251013 A1 | 11/2005 | Krishnan et al. | |
| 2006/0159367 A1* | 7/2006 | Zeineh et al. | 382/276 |
| 2006/0228015 A1* | 10/2006 | Brockway et al. | 382/132 |
| 2008/0219530 A1 | 9/2008 | Levanon et al. | |
| 2008/0230705 A1* | 9/2008 | Rousso et al. | 250/363.04 |
| 2009/0069668 A1 | 3/2009 | Stemmer | |

FOREIGN PATENT DOCUMENTS

| | | | |
|---|---|---|---|
| WO | 2006062969 A1 | 6/2006 | |
| WO | 2007046025 A2 | 4/2007 | |
| WO | 2008050222 A2 | 5/2008 | |
| WO | 2009024919 A2 | 2/2009 | |

* cited by examiner

*Primary Examiner* — Weiwen Yang

(57) ABSTRACT

A system and method are provided to automatically assess a confidence in imaging data based on a proposed diagnostic task or treatment decision, by determining one or more imaging quality indicators relating to the imaging data corresponding to a confidence of the proposed diagnostic task or treatment decision, comparing those imaging quality indicators with confidence benchmark values, and determining a confidence value indicative of the confidence in the imaging data for purposes of performing the proposed diagnostic task or making the proposed treatment decision.

32 Claims, 2 Drawing Sheets

AUTOMATIC ASSESSMENT OF CONFIDENCE IN IMAGING DATA

CROSS REFERENCE TO RELATED APPLICATIONS

This application claims the benefit of U.S. provisional application Ser. No. 61/175,561 filed May 5, 2009, which is incorporated herein by reference.

The present application relates generally to the imaging arts, and in particular a method to automatically assess a confidence in imaging acquisition data. It is especially useful in assessing the confidence to be placed in dynamic functional imaging acquisitions.

Dynamic, contrast-enhanced, functional imaging data is often used to diagnose ischemia in the brain or heart, and also to perform perfusion studies to assess blood flow and permeability in normal tissue and in tumors. Dynamic functional data can be generated by many imaging modalities. For example, computed tomography (CT) scanners can generate images of internal processes within the patient's body with the use of contrast agents. Other imaging modalities which can be used for dynamic functional imaging studies include some x-ray based modalities other than CT scanners, positron emission tomography (PET), single photon emission computed tomography (SPECT), magnetic resonance imaging (MRI), ultrasound, and others.

Thus dynamic functional imaging data is formed of several images of the tissues of interest over a time period. In a perfusion study, for example, an imaging scan protocol is executed after introduction of a contrast agent into the blood stream circulating through the tissues of interest. The resulting images may be used to generate time-concentration curves or TCC(t), representing the concentration of the contrast agent in the tissues of interest over a period of time. TCC's may be analyzed to determine local blood volume, perfused blood flow, permeation rate of blood through compromised vessel walls, and the like. The results of such a perfusion study are often presented as functional parameter maps, reflecting the TCC's. These maps or other equivalent data are used by medical professionals to perform a medical diagnosis and make treatment decisions, based in part on the information presented concerning blood flow within the tissues of interest. However, just as in any study, the confidence placed in medical diagnosis and treatment decisions may only be as good as the data upon which they are made. Thus, an important consideration in the medical diagnosis and treatment process is to evaluate the confidence to be placed in the dynamic functional imaging acquisition for the purpose of making a particular diagnosis or treatment decision.

For example, the imaging acquisition needs to cover the correct region of interest during the correct time period. To image the correct region of interest, the movement of the radiation source (if any), the radiation cameras, and the table movably supporting the patient should be coordinated to generate an appropriate scan length and field of view for the cameras. If these components are not placed correctly in relation to one another, the imaging acquisition may very well miss its target field of view within the patient being imaged. Concerning the timing of the imaging study, the start of the image scanning protocol should be coordinated with the contrast agent injection procedure to ensure the contrast agent is appropriately imaged during the acquisition. The contrast agent injection procedure includes many pertinent variables, including contrast agent volume, rate of injection, duration of injection, flushing of the contrast agent, and others.

All those and other imaging quality parameters should be appropriately coordinated in order to perform a high quality dynamic functional imaging acquisition. If they are not appropriately coordinated, then incorrect functional maps—or functional maps that may be easily misinterpreted by a medical professional—may result from the acquisition. For example, the imaging study may not acquire the first pass of contrast agent through the region of interest. Or, the imaging study may start too late to record at least one non-contrasted baseline image. Other difficulties outside of the imaging acquisition equipment and protocol, such as voluntary or involuntary motion of the patient being imaged, can further complicate these issues. Use of such incorrect functional maps could very well lead to an incorrect medical diagnosis or an improper treatment. Thus many problems can arise in dynamic functional imaging acquisitions if any one of several factors is not properly controlled or accounted for. There is therefore a need for automatically determining, in a relatively quick manner, the confidence to be placed in the imaging data resulting from a dynamic functional imaging acquisition.

Therefore, according to one aspect of the invention, a system and method are provided herein to automatically assess a confidence in imaging data based on a proposed diagnostic task or treatment decision, by determining one or more imaging quality indicators relating to the imaging data corresponding to a confidence of the proposed diagnostic task or treatment decision, comparing those imaging quality indicators with confidence benchmark values, and determining a confidence value indicative of the confidence in the imaging data for purposes of performing the proposed diagnostic task or making the proposed treatment decision.

1. Imaging Acquisition Systems

Figure 1:
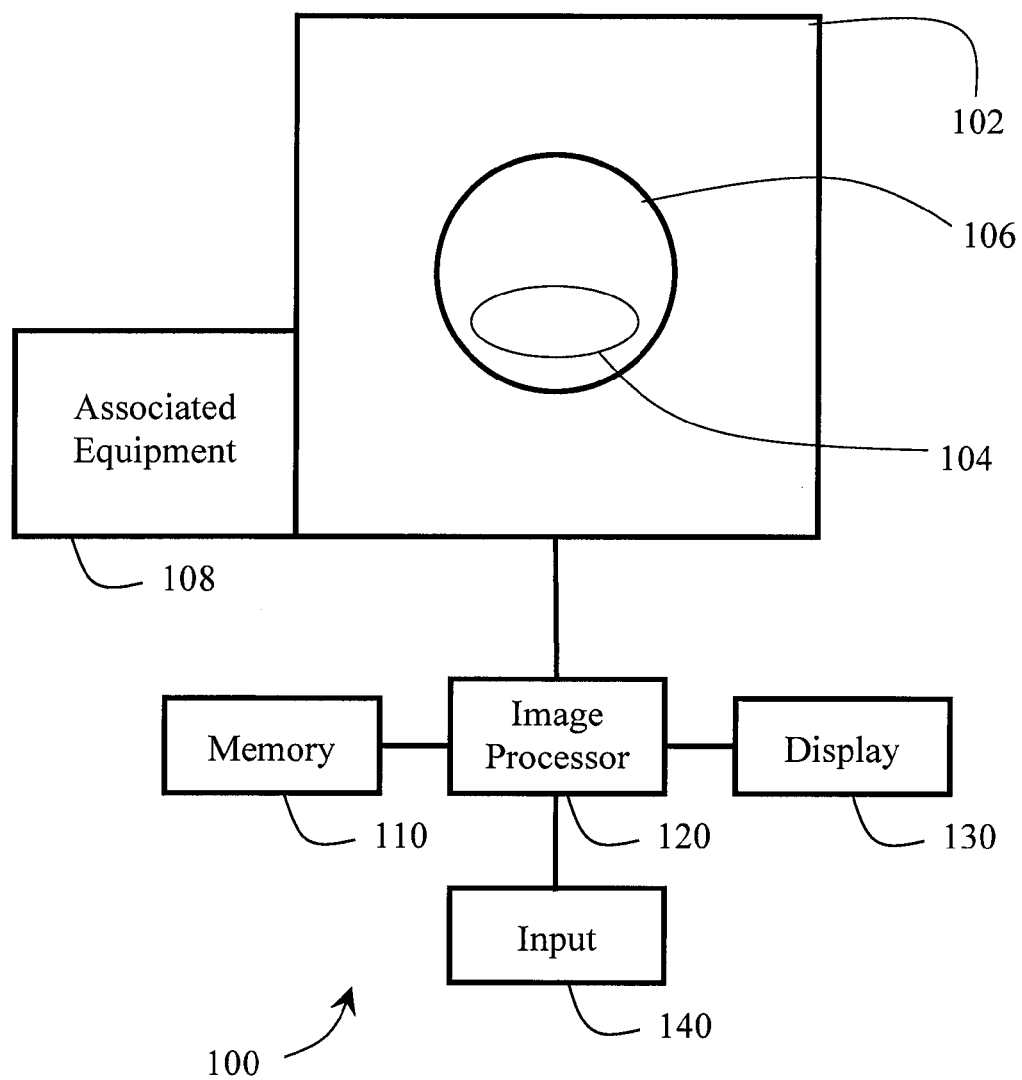
FIG. 1 illustrates an exemplary imaging system 100.

Currently, many different kinds of imaging systems are used to obtain dynamic functional imaging information. Such imaging information typically includes anatomical imaging data that has been combined with additional physiological data from an imaged subject over a period of time, such as image data relating to perfusion parameters. These kinds of imaging systems include CT, PET, SPECT, MRI, and other imaging systems. An exemplary such imaging system 100 is shown in FIG. 1. As already mentioned, however, the imaging method and apparatus disclosed herein also have application in connection with various other kinds of imaging systems or combinations of imaging systems other than those expressly discussed herein.

As illustrated in FIG. 1, an exemplary imaging system 100 includes an imaging device 102, such as a CT, PET, SPECT or MRI imaging device. A representative subject to be imaged is shown at 104 in FIG. 1, partially received in an aperture 106 of the imaging device 102. The image data obtained by the imaging device 102 is stored by an imaging data processor 120 in a memory 110. For example, if the imaging system 100 is a CT imaging system, the processor 120 receives x-ray data from a CT imaging device 102 to generate CT images. The image data stored in the memory 110 is processed by the imaging data processor 120. The processor 120 generates an image of the imaged subject 104, according to a mathematical algorithm or algorithms. The image can be displayed on an associated display 130. A user input 140 may be provided for a user to control the image processor 120. Associated equipment 108 may be provided to perform tasks relating to the imaging scan, such as a contrast agent injector to provide contrast-enhanced imaging.

The aforementioned functions, and the processes described below, can be performed as software logic. "Logic," as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory such as memory 110, part of an operating system or other type of executable instructions. It will be appreciated by one of ordinary skill in the art that the form of software is dependent on, for example, requirements of a desired application, the environment it runs on, and/or the desires of a designer/programmer or the like.

The systems and methods described herein can be implemented on a variety of platforms including, for example, networked control systems and stand-alone control systems. Additionally, the logic shown and described herein preferably resides in or on a computer readable medium such as the memory 110. Examples of different computer readable media include Flash Memory, Read-Only Memory (ROM), Random-Access Memory (RAM), programmable read-only memory (PROM), electrically programmable read-only memory (EPROM), electrically erasable programmable read-only memory (EEPROM), magnetic disk or tape, optically readable mediums including CD-ROM and DVD-ROM, and others. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated, and/or re-organized in their implementation as warranted or desired.

Thus, the imaging assessment process and computation of quantitative confidence measures with subsequent user feedback, as discussed below, can be integrated into software on a scanner console such as the system 100. In another embodiment, the processes discussed below can be integrated into software on a workstation which is separate from a scanner console. Such a workstation receives imaging data previously generated by a scanner console, for evaluations and analyses separate from the imaging acquisition itself. This frees up the scanner console to perform further imaging acquisitions while data from previous acquisitions are studied at the workstation. In yet another embodiment, the processes discussed below can be implemented on a thin client. A thin client computer is basically the same as a workstation, except that it is remotely connected to another computer which actually stores the image data and software for performing operations and presenting images to a user using the thin client. Alternatively or additionally, a distributed network system such as a picture archiving and communicating system (PACS) can be used, for example, to transfer feedback on image quality to the scanner console after processing on a workstation or thin client.

2. Confidence Assessment

The concepts described here are generally applicable to assess the confidence in any imaging study. However, the details of how to build and implement these concepts are application-specific to the particular study being conducted, and the reasons for conducting the study. This description therefore discusses a dynamic brain perfusion study as a representative example. In such studies, the measured functional values are often a cerebral blood flow CBF, a cerebral blood volume CBV, or a mean transit time MTT of blood. One of ordinary skill in this art will be able to apply the concepts discussed here to evaluate the confidence in any other imaging acquisition performed in the course of a diagnosis or treatment decision. Dynamic functional acquisitions may be performed, for example, in connection with planning or evaluating therapeutic treatments, chemotherapy treatments, ablation treatments, or any other treatments where the pertinent anatomical structures and/or functional values in the structures are or may be changing over time.

A. Quantifying Confidence

An automated process is provided to assess the confidence in an imaging acquisition with respect to the specific needs of a particular study. "Confidence" herein means an assessment of whether the quality of the imaging acquisition is sufficiently accurate and reliable to be used by a professional in making a diagnosis and, optionally, also determining a related action plan based on the diagnosis. In the particular context of a brain perfusion study, for example, the professional is typically a doctor or else a technician trained specifically to review functional maps of the brain and diagnose whether reversible ischemia is present in the brain. That diagnosis may then optionally be used to determine an appropriate action plan, such as whether surgery is required, or whether to apply a particular drug regimen, and the like.

Thus, the automated assessment of a confidence may depend upon quantitative imaging quality factors. There are at least two kinds of such factors. A first kind of imaging quality factor indicates how accurately the images which result from the imaging acquisition reflect the reality of the patient being imaged. A second kind of imaging quality factor indicates whether the imaging acquisition was directed to the correct region of interest at the correct time. It is clear that these two imaging quality factors are separate considerations. That is, a particular image may accurately reflect the wrong region within the patient's body and/or at the wrong times. Conversely, a particular image may inaccurately reflect the correct region within the patient's body at the correct times. Other factors either in place of or in addition to these two factors may appropriately be considered as imaging quality factors used to assess a confidence in an imaging acquisition.

A confidence is determined based on the specific context of the need for performing the imaging acquisition, that is, the diagnostic task or required clinical treatment. The same image acquisition with the same set of image quality features can have different values of confidence depending on the diagnostic task or clinical decision involved. For example, the needed minimum confidence to proceed with any given proposed medical treatment will vary with the nature of the proposed treatment. As a more specific example, assume a brain perfusion acquisition results in an image having only a mediocre image quality, corresponding to a given set of quantitative imaging quality factors. When comparing those factors against different benchmark confidence values, the outcome can very well be: a high confidence to identify ischemic regions in the brain; only mediocre confidence to identify reversible ischemia (which could be a target of therapy); or a poor confidence in identifying the risk of undesired side effects from therapy.

Figure 2:
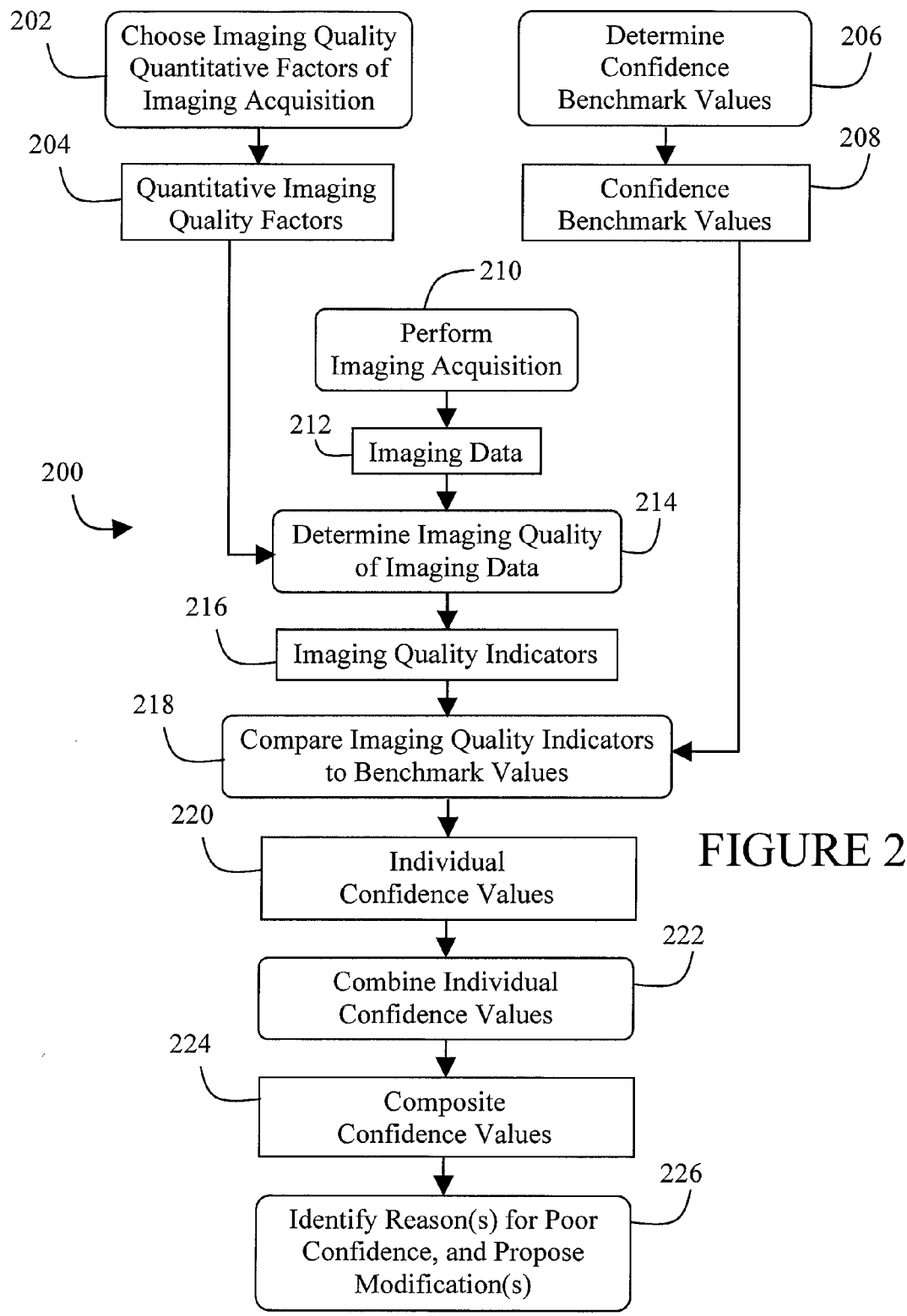
FIG. 2 illustrates a representative automated process 200 to assess the confidence in a dynamic functional imaging acquisition.

FIG. 2 shows a representative automated process 200 to assess the confidence in an imaging acquisition with respect to the specific needs of a particular study. The ordering of the steps of the process 200 as shown in FIG. 2 may be changed to suit the needs of a particular application, and some steps may be added or removed from the exemplary process 200 shown and described here.

According to the exemplary process 200, in step 202 one or more imaging quality quantitative factors 204 of an imaging acquisition are chosen for use in assessing the confidence to be placed in the imaging data resulting from the acquisition. The chosen imaging quality quantitative features will likely vary depending upon the diagnostic task or related action plan decision being made.

In the particular context of a brain perfusion analysis, studies have suggested there are three principal reasons for a decreased imaging quality in an imaging acquisition. One cause of decreased imaging quality is incomplete imaging of the first pass of contrast agent as a result of imaging either too early or too late. A second cause of decreased imaging quality is artifacts resulting from movement of the patient's head. And a third cause of decreased imaging quality is insufficient coverage of the target field of view. Thus each of these reasons is a potential quantitative value 204 to choose at step 202 for evaluation of a confidence, and to then use as the basis for determining a confidence (as discussed further below). Each is therefore discussed in turn.

One reason for decreased imaging quality in a brain perfusion imaging acquisition is incomplete imaging of the first pass of contrast agent. The likelihood of whether a brain perfusion imaging scan may have only partially covered or entirely missed the first pass of contrast agent can be quantified in any one of several ways. As one representative example, one can assess the passing of contrast agent by observing the curve of the total amount of contrast agent over the duration of the acquisition. Thus suppose the peak image intensity corresponding to the contrast agent during the imaging acquisition (measured in Hounsfield Units for example) is $HU_{peak}$, and the image intensity in the last imaged slice is $HU_{end}$. The ratio between these two values, $HU_{end}/HU_{peak}$, is a good quantitative measure of whether the imaging acquisition completely observed the first pass of contrast agent. In preliminary experiments, $HU_{end}/HU_{peak}$ values above about 0.6 reliably predict poor functional maps resulting from incomplete imaging of the first pass of contrast agent. Thus the ratio $HU_{end}/HU_{peak}$ represents a quantitative measure 204 that increases with a decreasing imaging quality in the presented functional maps. This is just one method to quantify the likelihood of whether a brain perfusion imaging scan may have incompletely measured the first pass of contrast agent. That quantitative measure of imaging quality 204 may be used alone, or some other quantitative measure 204 may be used, or a combination of quantitative measures 204 perhaps with a weighting scheme may be used. In this way, a first quantitative data point is provided assessing the imaging quality in a brain perfusion imaging acquisition, directed to indicating whether the first pass of contrast agent was completely imaged.

A second reason for decreased imaging quality in a brain perfusion imaging acquisition is that artifacts may result from movement of the patient's head during the acquisition. The likelihood of whether a brain perfusion imaging scan contains motion artifacts can be quantified in any one of several ways. As one representative example, residual differences in intensity between adjacent images in regions where the intensity should not change when contrast agent is present, such as regions lacking any contrast agent uptake, can quantify motion artifacts that are not fully compensated for by image registration. Appropriate regions for this purposes include bones, like the skull, or other application-specific anatomical structures. Such difference measures represent a quantitative measure that increases with a decreasing imaging quality in the presented functional maps. This is just one method to quantify the likelihood of whether a brain perfusion imaging scan may be compromised by motion artifacts. That quantitative measure 204 may be used alone, or some other quantitative measure 204 may be used, or a combination of quantitative measures 204 perhaps with a weighting scheme may be used. In this way, a second quantitative data point is provided assessing the imaging quality in a brain perfusion imaging acquisition, directed to indicating whether motion artifacts are present.

A third reason for decreased imaging quality in a brain perfusion imaging acquisition is insufficient coverage of the target field of view. A corollary difficulty occurs when the imaged field of view during a principal brain perfusion scan differs from the imaged field of view during a prior survey or scout scan. These issues can be a particular concern in the context of an acute stroke, one major clinical application of brain perfusion imaging, where patient compliance with imaging instruction is low. The likelihood of whether a brain perfusion imaging scan has insufficiently covered the target field of view can be quantified in any one of several ways. As one representative example, the acquired image data may be registered to imaging data from a template, atlas or model.

Such a registration can be done, for example, by using known anatomical or other features common to both the acquired image data set being assessed and the template, atlas, or model data set, which features are not affected by the functional analyses being measured. For example, the skull regions of the two data sets may be used as a common marker to perform the registration. From that registration, the distance between the field of view of the measured imaging data being assessed and the target field of view in the template, atlas or model data (e.g., the mid cerebral artery territories) may be calculated. That distance is a quantitative measure 204 that increases with decreasing imaging quality in the presented functional maps. This is just one method to quantify the likelihood of whether a brain perfusion imaging scan may have insufficiently covered the target field of view. That quantitative measure of imaging quality 204 may be used alone, or some other quantitative measure 204 may be used, or a combination of quantitative measures 204 perhaps with a weighting scheme may be used. In this way, a third quantitative data point is provided assessing the imaging quality in a brain perfusion imaging acquisition, indicating whether the target field of view was covered.

Those are just three quantifiable factors 204 for a decreased imaging quality in a brain perfusion imaging study, and just one representative way to quantify each respectively.

There are also many more quantitative indicators of imaging quality 204 in a brain perfusion imaging scan, such as the signal-to-noise ratio and the contrast-to-noise ratio. Artifacts resulting from metallic implants, dental work, or medical equipment (e.g., backboards, etc.) may be similarly part of 204 and computed in 214. Other quantitative imaging quality factors 204 pertinent to a brain perfusion study relate not only to the CT scanner or other imaging device 102, but also or solely to associated equipment 108, such as the contrast agent injector. That is, even if an imaging device 102 is working properly to gather imaging data during an acquisition, still a low imaging quality (and therefore a low confidence) is possible if the contrast agent injector was not working properly or was poorly synchronized with the imaging device 102. Typical problems which might arise include starting the injection at the wrong moment, obstructions in the contrast agent catheter, using a contrast agent having an insufficient density, and the like.

The exact features 204 to be used and the weight associated to each of those features in the analysis 200 may be identified through observational studies. Additionally, the quantitative evaluation may be modified over time to account for new features as they are discovered, such as for example by using configuration files in the imaging quality assessment system 100. In this way, a set of quantitative imaging quality factors 204 is chosen to evaluate the quality of an imaging acquisition, in the course of determining a confidence of the imaging scan.

In step 206, a set of confidence benchmark values 208 is determined. Thus, confidence benchmark values 208 are associated with each imaging quality quantitative factor 204. Importantly, the confidence benchmark values 208 will vary depending upon the reasons for performing the imaging acquisition, that is, the diagnostic task to be performed and perhaps the action plan to be made. The confidence benchmark values 208 may be obtained or generated from many sources, such as databases of representative image data, or the data from one or more imaging acquisitions specifically performed to determine an appropriate benchmark value 208, and the like.

In a first embodiment, the benchmark values 208 are representative of a successful imaging acquisition. Thus, in this first embodiment, the closer an assessed dynamic functional acquisition is to the benchmark values 208, the higher the confidence in the imaging acquisition. Conversely, the farther away the assessed dynamic imaging acquisition is from the benchmark values 208, the lower the confidence in the imaging acquisition. In a second embodiment, the benchmark values 208 are representative of an unsuccessful dynamic functional imaging acquisition. Thus, in this second embodiment, the closer the assessed dynamic functional acquisition is to the benchmark values 208, the lower the confidence in the imaging acquisition. Conversely, the farther away the assessed dynamic functional acquisition is from the benchmark values 208, the higher the confidence in the imaging acquisition.

In step 210, an imaging acquisition is performed, generating imaging data 212 to be assessed for a confidence. In step 214, the quantitative imaging quality factors 204 are applied to the imaging data 212, to generate a set of imaging quality indicators 216 corresponding to the imaging data 212. At step 218, those indicators 216 are compared against the confidence benchmark values 208. This comparison 218 results in a set of individual confidence values 220, representative of the confidence which may be placed in the imaging data 212.

So, returning to the representative example of a brain perfusion analysis, several quantitative imaging quality factors 204 were discussed above. The first such factor 204 assessed whether the first pass of contrast agent was incompletely imaged, by calculating $HU_{end}/HU_{peak}$. Corresponding confidence benchmark values 208 will depend upon the diagnostic task or treatment decision at hand, such as for example according to the following matrix:

| Individual Confidence Value | Diagnostic Tasks and Corresponding Confidence Benchmark Values of $HU_{end}/HU_{peak}$ | | |
| --- | --- | --- | --- |
| | Diagnostic Task #1: Identify Ischemic Regions | Diagnostic Task #2: Identify Reversible Ischemia | Diagnostic Task #3: Identify Risk of Undesired Side Effects from Therapy |
| 1 | Less than 0.4 | Less than 0.3 | Less than 0.2 |
| 2 | 0.4 to 0.6 | 0.3 to 0.5 | 0.2 to 0.4 |
| 3 | More than 0.6 | More than 0.5 | More than 0.4 |

Thus, in the example, if the diagnostic task is to identify ischemic regions within the brain, and the $HU_{end}/HU_{peak}$ value 204 is between 0.4 and 0.6, the individual confidence value 220 is equal to 2. And so on throughout the matrix. In this example, a lower individual confidence value 220 corresponds to a higher confidence. If only this one imaging quality factor 204 (whether the first pass of contrast agent was incompletely imaged) is pertinent to the diagnostic task at hand, then the calculation 218 of a confidence value would stop here. In that event, an individual confidence value equal to 1 would correspond to a good confidence, a value of 2 would correspond to a mediocre confidence, and a value of 3 would correspond to an unacceptable confidence.

More likely, however, several different imaging quality factors 204 of the brain perfusion imaging acquisition 210 will impact the confidence value of the resulting imaging data 212. Thus a series of individual confidence values 220, each corresponding to a different quantitative imaging quality factor 204 of a brain perfusion analysis identified as being pertinent to the diagnostic task or treatment decision at hand, may be similarly calculated. Each one of those individual confidence values 220 may be used as separate individual indicators of confidence.

Alternatively, the individual confidence values 220 may be combined 222 to calculate one or more composite confidence values 224 as representative of some aspect thereof pertinent to the particular study being conducted, or perhaps the overall confidence. The combination 222 of individual quantitative confidence values 220 to form a composite confidence value 224, if desired, may be achieved in a number of ways. For example, suppose that in the case of each individual confidence value 220, a higher number corresponds to a lower confidence. In that case, the individual confidence value 220 may simply be added 222 together, because a high resulting sum 224 indicates a low confidence while a low resulting sum 224 indicates a good confidence. Of course, if a higher number represents a higher confidence, then the opposite would apply. Standards may be set, so that resulting sums 224 in particular ranges are respectively grouped together as "good", "mediocre" or "unacceptable" confidences.

There are, of course, more sophisticated ways to combine 222 individual quantitative values 220 into one or more composite values 224 to assess confidence. Such methods use well-known data combination concepts such as weighted combinations, principal component analysis, linear discriminant analysis, voting, clustering, a support vector machine, artificial neural networks, and the like. In a preferred embodiment, whatever combination method 222 is used to calculate a composite confidence value 224, the resulting composite value 224 is then normalized into one final value of confidence from 0 to 1.

B. Presenting Confidence Results to a User

Once the individual confidence values 220 and/or the composite confidence values 224 are obtained, they may be presented to interested users of the imaging data 212 in many ways. Interested users may include technicians who are trained to perform an imaging acquisition 210, but who have no other formal medical education or training. They may also include other professionals having various amounts of medical training, including doctors, nurses, academic researchers, and the like. Thus, a diverse population of users may be involved in any particular circumstance, and the presentation of confidence results to the users can be tailored to meet the needs of a particular audience.

For relatively untrained users, such as imaging technicians, a simplified presentation of the confidence assessment may be used. In this case, a three-level system might be used, wherein the process 200 determines whether the imaging acquisition 210 was "good", "mediocre", or "unacceptable" based on the confidence values 220 or 224. A report of "good" indicates the confidence is sufficiently high for the results of the acquisition to be used for medical diagnosis and treatment decisions, or for other purposes. A report of "mediocre" corresponds to a warning that there may very well be problems with the imaging data 212 which are significant enough to reduce the confidence in a medical diagnosis. A report of "unacceptable" strongly suggests the imaging data 212 from the imaging acquisition 210 should not be used for medical diagnosis or treatment decisions, or for any other purpose. In a similar embodiment, the quality rating may be presented in an intuitive or real-world manner. For example, a graphical user interface 130 may include a traffic light, where a green light corresponds to "good", a yellow light corresponds to "mediocre", and a red light corresponds to "unacceptable."

In this or some other manner, the results of the confidence assessment 200 can for example be provided to an imaging technician or other user either during the imaging acquisition 210 or just after the imaging acquisition 210 is completed, while the patient being imaged is still available for further imaging if that is required. This embodiment is especially helpful in making time-critical treatment decisions, for example medical emergencies such as acute stroke. In those and other situations, the risk of delaying diagnosis and treatment is significant, so that any savings in time is especially important.

For more sophisticated users, such as doctors and academic researchers, other presentations may be preferred to convey more detailed information concerning the confidence 220 or 224 in an imaging acquisition 210. Thus, as one preferred embodiment, the automated process 200 presents imaging study results 212 such as functional parameter maps together with the confidence values 220 or 224 corresponding to those results 212. The confidence values 220 or 224 may be presented in a quantitative manner, to provide detailed information concerning the confidence in the imaging acquisition 210. In one embodiment, a single composite confidence value 224 may be presented to the user as representative of the overall confidence, for example either as a confidence percentage (a value between 0 and 100) or as a simple visualization technique on a graphical user interface (a bar chart for example). Alternatively, more than one confidence value 220 or 224 may be presented to the user, where each value 220 or 224 represents the quality of a different aspect of the image acquisition 210 which may be particularly pertinent to the user's needs. Such quantifications provide feedback not only concerning the quality of the acquisition 210, but also concerning the confidence that may be placed on medical diagnosis or treatment decisions based on the imaging data 212. Based on the quantitative feedback, the user can decide to either proceed with medical diagnosis and treatment by using the current imaging acquisition results 212, or perform another imaging scan 210 in order to try and improve the confidence before proceeding to make decisions based on the new results.

As already stated, one component in the process 200 is to identify a particular diagnostic study being conducted by the user. The factors chosen at step 202, and the benchmarks determined at step 206, depend on that information. Thus, in order for a computer (whether it is a scanner console, a workstation, a thin client, or some other computer) to implement the process, the diagnostic study should be identified. In one embodiment, the user may select the diagnostic task(s) at hand from a pre-determined list of options stored in a memory of the computer. In another embodiment, the computer automatically determines the diagnostic study from stored information, such as is typically available from a PACS, HIS, RIS, or other such system. In yet another embodiment, the computer may automatically determine confidence values corresponding to a pre-determined set of diagnostic tasks or treatment decisions, and report all those values to the user.

In yet further embodiments, in addition to the confidence assessment, the process 200 may identify one or more reasons for a poor confidence 226 and present them to the user. Each computed confidence value 220 or 224 carries information about how the acquisition 210 could have been improved. For example, if one particular confidence value 220 exceeds preset maximum or minimum values which represent the outer bounds of a normal operation, this may be identified to the user. Thus, if a quantification 220 which corresponds to the presence of motion artifacts in the image significantly deviates from normal values, the user can be so informed and thus take corrective measures in a subsequent imaging scan to hold the patient still. In this way the automated process 200 may propose 226 one or more context-sensitive modifications to the image acquisition technique 210 to increase the confidence assessment value 220 or 224 in a subsequent scan. Such modifications may concern the imaging scan protocol, the contrast agent injection protocol, the selected field of view, how to reduce patient motion, or any other aspect of the imaging process. The modifications may relate to the imaging device 102 such as a CT scanner, or to associated equipment 108 employed to generate dynamic functional imaging data, such as the contrast agent injector. For example, improving a low contrast to noise ratio in the imaging data 212 might require changes to the imaging procedure (e.g. x-ray dose) or changes to the contrast injection procedure (e.g. contrast agent used, the amount injected, the rate of injection). This feedback may facilitate future imaging acquisitions having a higher confidence, as it "teaches" the user how to obtain better scans.

Indeed, the identification process 226 may be based on the history of quality features for multiple acquisitions at a particular institution. In this way, repeated quality problems may be recognized and potentially improved while individual poor acquisitions may not trigger such a message or may trigger a gentler reminder. Quality tracking such as this may also play an important role with the development of pay-for-performance strategies. In a preferred embodiment, the identification and suggestion process 226 may be performed and displayed only on the scanner console which controls the image acquisition 210, and is not performed at workstations or thin clients where the resulting image data 212 is analyzed. At those other computers, only the confidence values 220 or 224 are displayed, in connection with that preferred embodiment.

As already mentioned, the concepts described here are generally applicable to assess the image quality and confidence for any imaging study. The details discussed, as relating to the representative examples of a brain perfusion study, may or may not apply to other such studies. The details of how to build and implement these concepts are application-specific to the particular study being conducted, and the reasons for conducting the study. One of ordinary skill in this art will be able to apply these concepts to evaluate any other imaging acquisition performed in the course of a study.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof. The invention may take form in various components and arrangements of components, and in various steps and arrangements of steps. The drawings are only for purposes of illustrating the preferred embodiments and are not to be construed as limiting the invention.

Having thus described the preferred embodiments, the invention is now claimed to be:

1. A system to automatically assess a confidence in an dynamic functional imaging acquisition data based on a proposed diagnostic task or treatment decision, the system comprising a computer readable non-transitory medium configured to receive dynamic functional imaging data, the computer readable non-transitory medium comprising logic to:
    determine one or more imaging quality indicators relating to the acquisition of the acquired imaging data based on one or more quantitative imaging quality factors corresponding to a confidence of the proposed diagnostic task or treatment decision, wherein the one or more quantitative imaging quality factors each comprise a quantitative assessment of at least one of the accuracy, location, and timing of the acquisition, and wherein the one or more imaging quality indicators are generated by applying the one or more quantitative imaging quality factors to the acquired imaging data; and
    compare the one or more imaging quality indicators to one or more confidence benchmark values associated with the one or more quantitative imaging quality factors and determine a confidence value indicative of the confidence that the acquisition of the imaging data is of sufficient quality for purposes of performing the proposed diagnostic task or making the proposed treatment decision.

2. The system of claim 1, wherein the logic further generates at least one composite confidence value based on two or more individual confidence values.

3. The system of claim 2, wherein the logic generates the at least one composite value by a linear combination, a weighted combination, a principal component analysis, a linear discriminant analysis, a voting, a clustering, a support vector machine, or an artificial network.

4. The system of claim 1, wherein the logic further generates time concentration curves from the imaging data.

5. The system of claim 1, wherein the confidence value indicates that the imaging data is appropriate for use in a brain perfusion study, and the imaging quality indicators correspond to a confidence in the brain perfusion study.

6. The system of claim 1, wherein the logic further presents the confidence value to a user of the system.

7. The system of claim 6, wherein the logic further presents the confidence value as corresponding to one level in a multi-level evaluation system.

8. The system of claim 6, wherein the logic further tailors the presentation of the confidence value to be different for different classes of users, based on the need of each class of users.

9. The system of claim 6, wherein the logic further presents the confidence value in conjunction with imaging results.

10. The system of claim 1 further comprising a scanner console which includes the logic, and the scanner console presents the confidence value to a user of the scanner console while a patient being imaged is still available for further imaging in the event the confidence level is not high enough.

11. The system of claim 1, wherein the logic further identifies a reason for a poor confidence value.

12. The system of claim 11, wherein the logic further proposes a modification to an image acquisition technique to increase the poor confidence value.

13. The system of claim 12, wherein the modification to the image acquisition technique may include changing a setting of either an imaging device or an associated equipment.

14. A method automatically implemented by a computer to assess a confidence in an dynamic functional imaging data based on a proposed diagnostic task or treatment decision, the method comprising:
    determining one or more imaging quality indicators relating to the acquisition of acquired dynamic functional imaging data based on one or more quantitative imaging quality factors corresponding to the proposed diagnostic task or treatment decision, wherein the one or more quantitative imaging quality factors each comprise a quantitative assessment of at least one of the accuracy, location, and timing of the acquisition, and wherein the one or more imaging quality indicators are generated by applying the one or more quantitative imaging quality factors to the acquired imaging data; and
    comparing the one or more imaging quality indicators to one or more confidence benchmark values associated with the one or more quantitative imaging quality factors, and determining a confidence value indicative of the confidence that he acquisition of the imaging data is of sufficient quality for purposes of performing the proposed diagnostic task or making the proposed treatment decision.

15. The method of claim 14, further comprising generating at least one composite confidence value based on two or more individual confidence values.

16. The method of claim 15, further comprising generating the at least one composite confidence value by a linear combination, a weighted combination, a principal component analysis, a linear discriminant analysis, a voting, a clustering, a support vector machine, or an artificial network.

17. The method of claim 14, further comprising generating time concentration curves from the imaging data.

18. The method of claim 14, wherein the confidence value indicates that the imaging data is appropriate for use in a brain perfusion study, and the imaging quality indicators correspond to a confidence in the brain perfusion study.

19. The method of claim 14, further comprising determining the confidence value as corresponding to one level in a multi-level evaluation system.

20. The method of claim 14, further comprising tailoring presentation of the confidence value to a user to be different for different classes of users, based on the need of each class of users.

21. The method of claim 14, further comprising identifying a reason for a poor confidence value.

22. The method of claim 21, further comprising proposing a modification to an image acquisition technique to increase the poor confidence value.

23. The method of claim 22, wherein the modification to the image acquisition technique may include changing a setting of either an imaging device or an associated equipment.

24. A training system to improve confidence in an dynamic functional imaging acquisition based on a proposed diagnostic task or treatment decision, the system comprising a computer readable non-transitory medium configured to receive dynamic functional imaging data, the computer readable non-transitory medium comprising logic to:

determine one or more imaging quality indicators relating to the acquisition of the acquired imaging data base on one or more quantitative imaging quality factors corresponding to the proposed diagnostic task or treatment decision, wherein the one or more quantitative imaging quality factors each comprise a quantitative assessment of at least one of the accuracy, location, and timing of the acquisition, and wherein the one or more imaging quality indicators are generated by applying the one or more quantitative imaging quality factors to the acquired imaging data;

compare the one or more imaging quality indicators to one or more confidence benchmark values associated with the one or more quantitative imaging quality factors and determine a confidence value indicative of the confidence that he acquisition of the imaging data is of sufficient quality for purposes of performing the proposed diagnostic task or making the proposed treatment decision;

identify a reason for a poor confidence value; and propose a modification to an image acquisition technique to increase the poor confidence value.

25. The system of claim 24, wherein the logic further presents the poor confidence value to a user of the system in conjunction with proposing the modification.

26. The system of claim 25, wherein the logic further presents the confidence value as corresponding to one level in a multi-level evaluation system.

27. The system of claim 25, wherein the logic further tailors the presentation of the confidence value to be different for different classes of users, based on the need of each class of users.

28. The system of claim 25, wherein the logic further presents the confidence value in conjunction with imaging results.

29. The system of claim 24, further comprising a scanner console which includes the logic, and the scanner console presents the confidence value to a user of the scanner console while a patient being imaged is still available for further imaging in accordance with the proposed modification.

30. The system of claim 24, wherein the modification to the image acquisition technique may include changing a setting of either an imaging device or an associated equipment.

31. The system of claim 1, wherein a first confidence value indicates that the imaging data is appropriate for use in one proposed diagnostic task or treatment decision and wherein a second confidence value indicated that the imaging data is not appropriate for use in another proposed diagnostic task or treatment decision.

32. The method of claim 14, wherein determining the confidence value comprises determining a first confidence value indicating that the imaging data is appropriate for use in one proposed diagnostic task or treatment decision and determining a second confidence value indicating that the imaging data is not appropriate for use in another proposed diagnostic task or treatment decision.

* * * * *